United States Patent [19]
Burnell et al.

[11] 3,974,792
[45] Aug. 17, 1976

[54] SEMI-SUBMERSIBLE, DIRECTIONALLY CONTROLLED DRILLING UNIT

[75] Inventors: Anthony John Burnell; Robert Grant, both of San Francisco, Calif.

[73] Assignee: Earl & Wright, San Francisco, Calif.

[22] Filed: Jan. 3, 1975

[21] Appl. No.: 538,393

[52] U.S. Cl. .......................... 114/144 B; 114/.5 D; 235/150.26; 318/588
[51] Int. Cl.² ..................................... B63H 25/00
[58] Field of Search ............... 114/.5 D, 126, 144 R, 114/144 B; 235/150.2, 150.1, 150.27, 150.26; 318/588

[56] References Cited
UNITED STATES PATENTS

| | | | |
|---|---|---|---|
| 3,280,311 | 10/1966 | Shatto et al. | 114/144 B |
| 3,610,193 | 10/1971 | Lacy et al. | 114/.5 D |
| 3,771,481 | 11/1973 | Goren et al. | 114/.5 D |
| 3,867,712 | 2/1975 | Harthill et al. | 114/144 B |

Primary Examiner—Stephen G. Kunin
Assistant Examiner—Jesus D. Sotelo
Attorney, Agent, or Firm—Flehr, Hohbach, Test

[57] ABSTRACT

A drilling unit is disclosed which incorporates a submersible streamlined hull supporting a streamlined upper hull above the surface of the water by support columns and trusses. The unit is directionally controlled by transverse thrusters and in-line propulsion screws in the submersible hull which are operated by a control system to maintain station keeping over the wellhead at an optimum heading for minimizing the effects of environmental forces such as wind, current and wave action. The control system senses the vessel's heading and surge and sway motions with respect to the wellhead reference and converts this information into error signals. The bow and stern thrusters and in-line propulsion screws are then operated to produce thrust forces which reduce the respective errors. In response to the generation of a stern thrust the control system iteratively calculates a change in the bow target point position on the target circle which will make the stern thrust trend toward zero.

23 Claims, 10 Drawing Figures

HEADING AND POSITION CONTROL

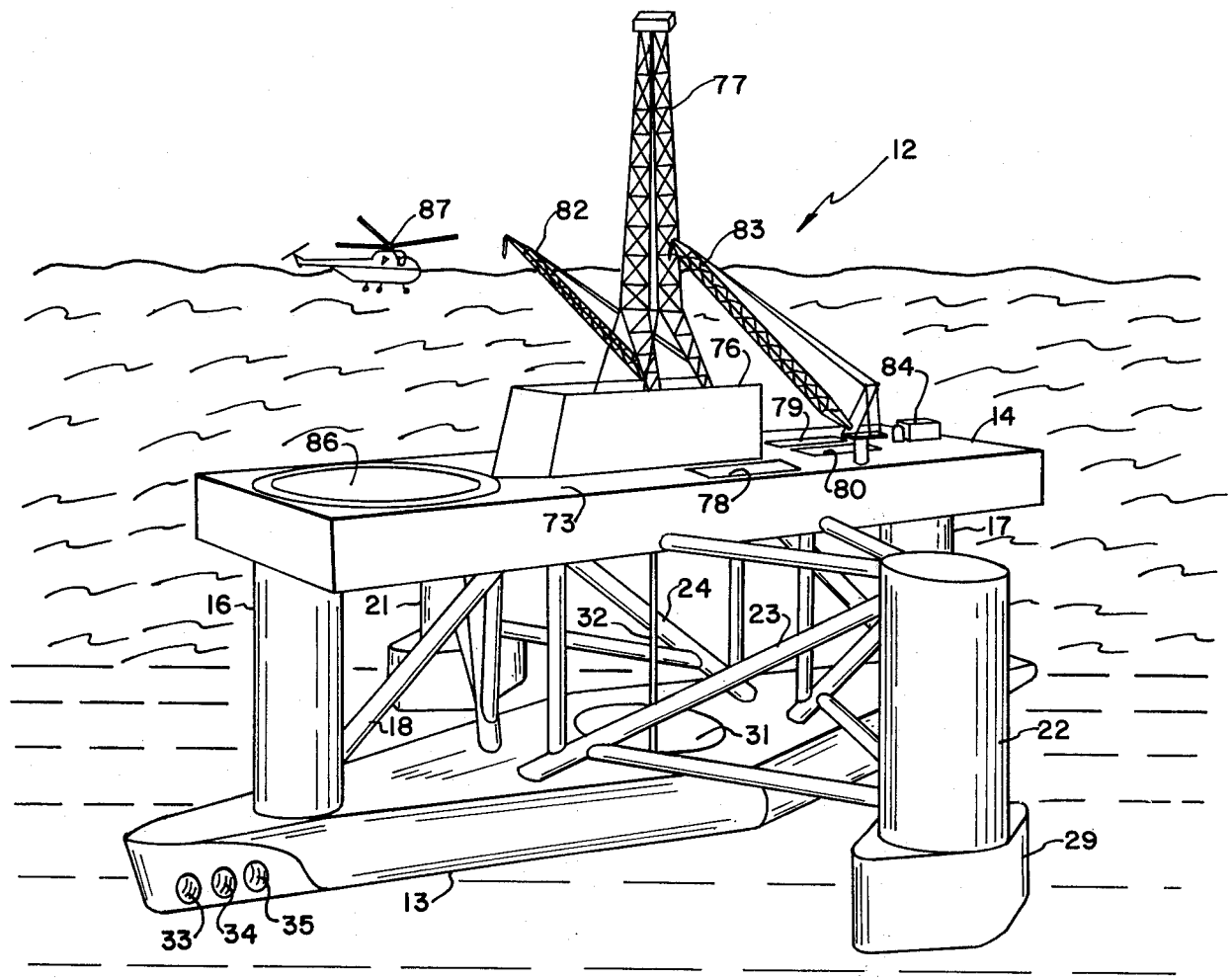
FIG.—1
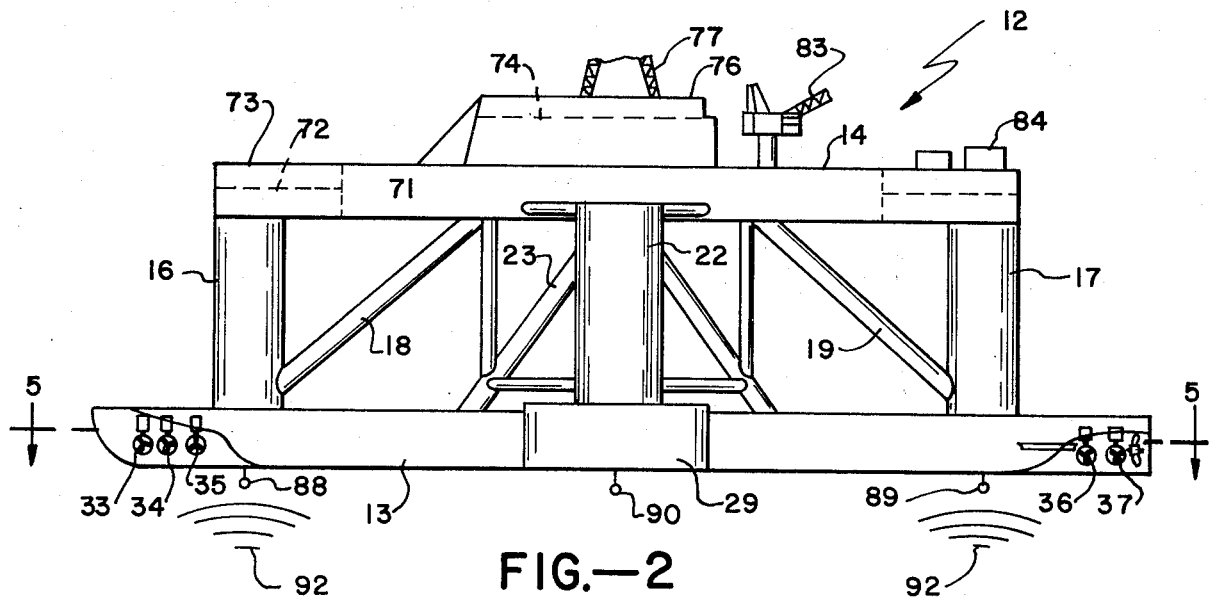
FIG.—2

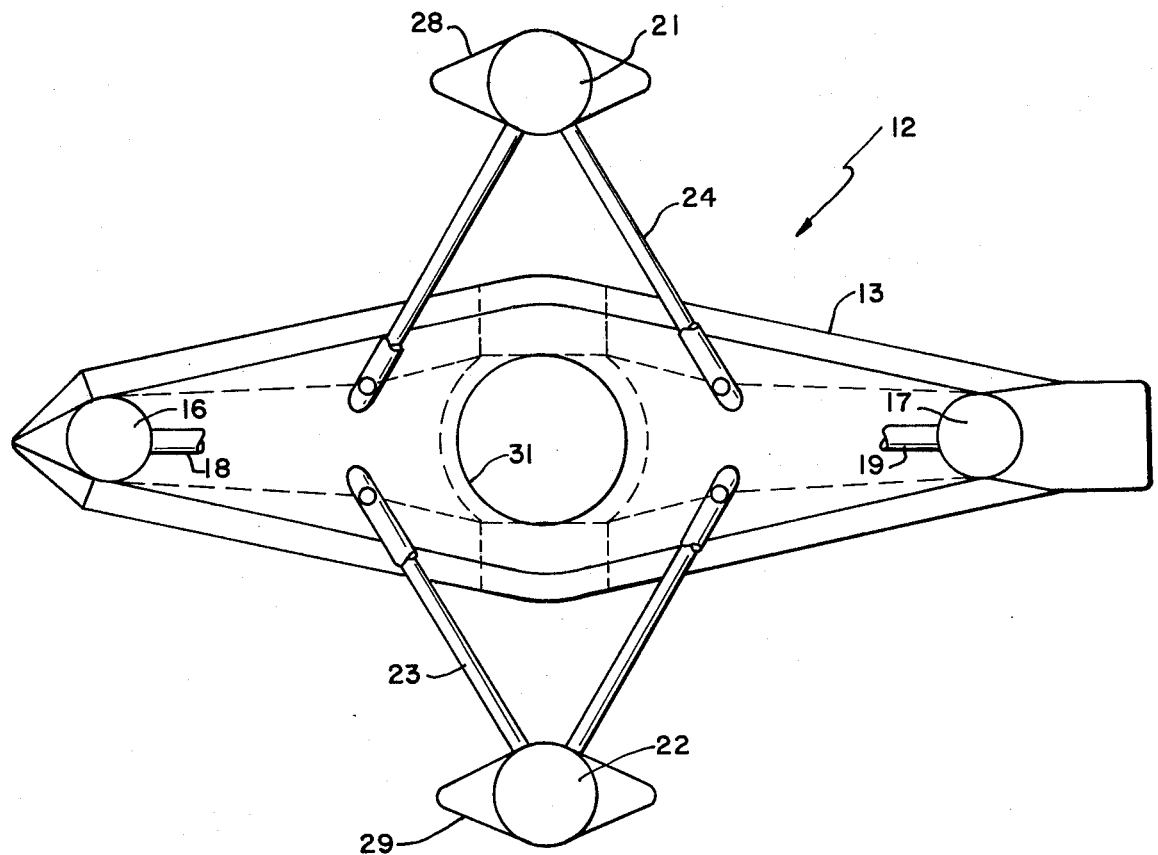
FIG.—3
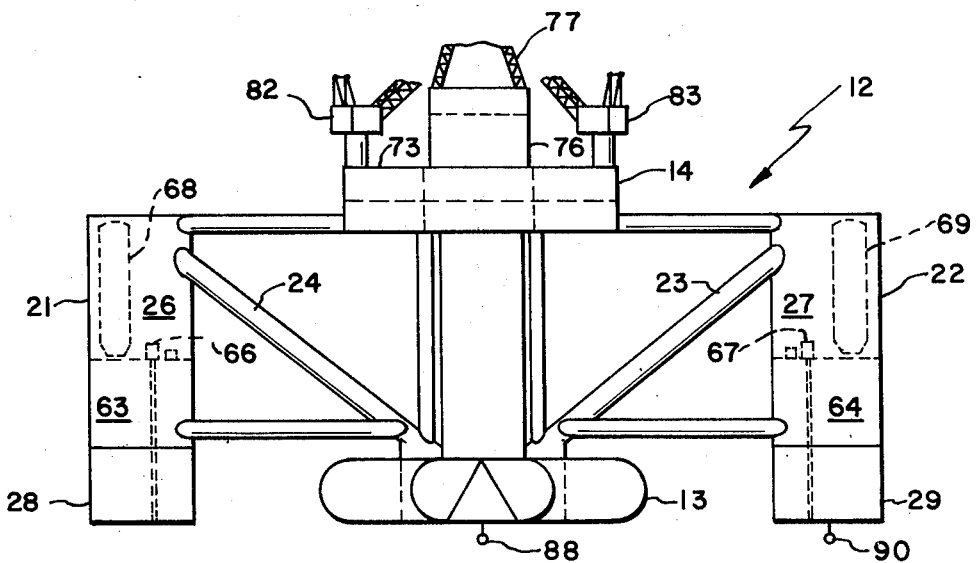
FIG.—4

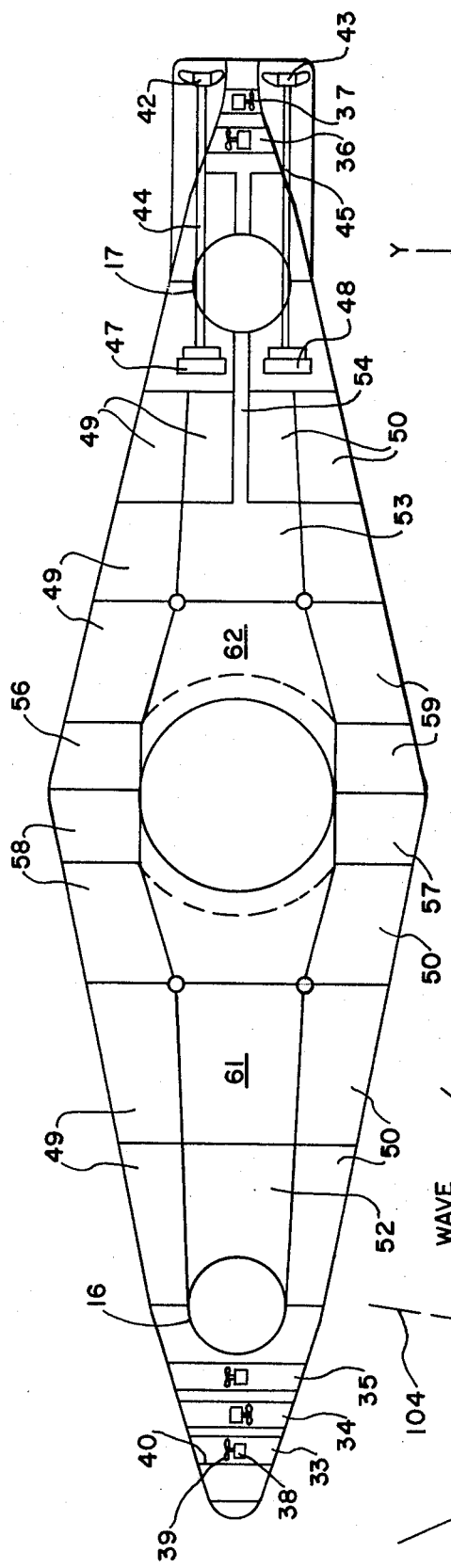
FIG.—5
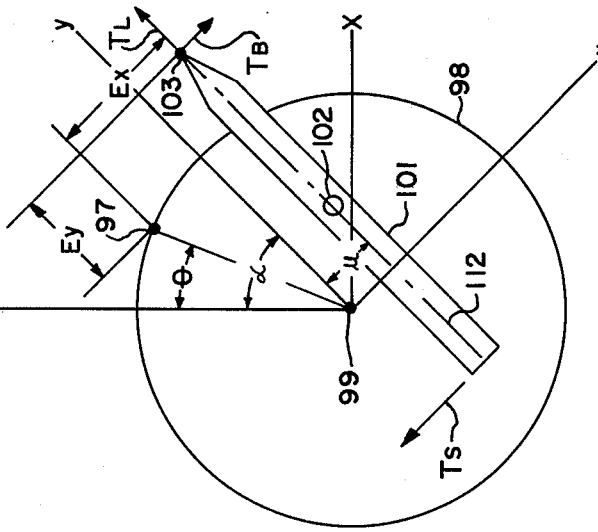
FIG.—8
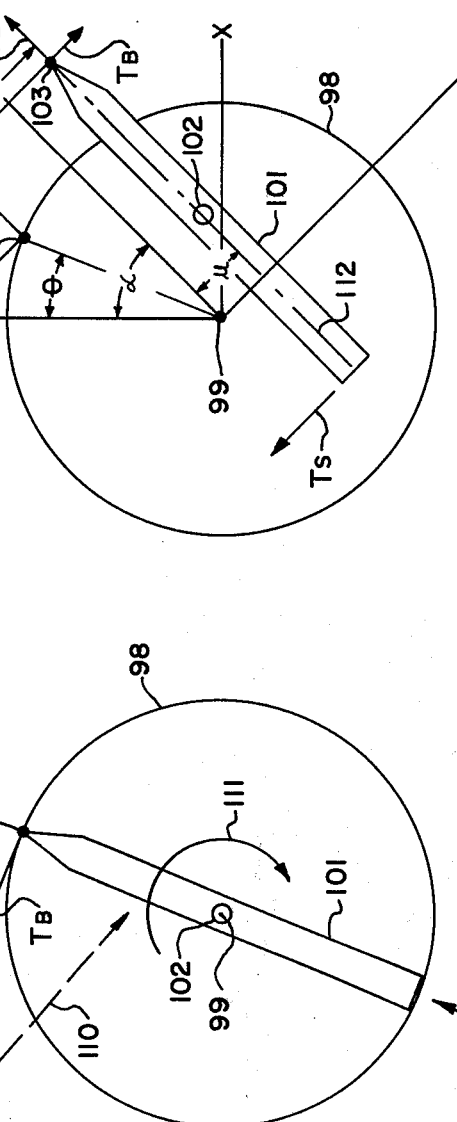
FIG.—7
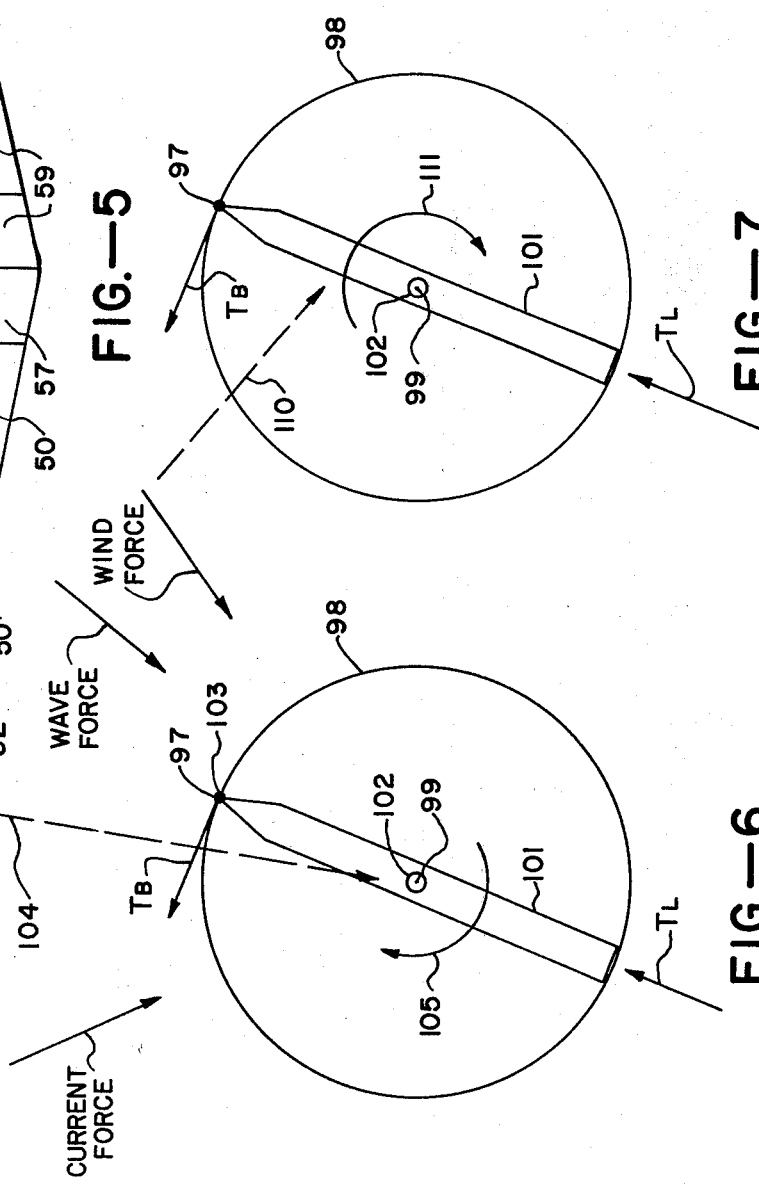
FIG.—6

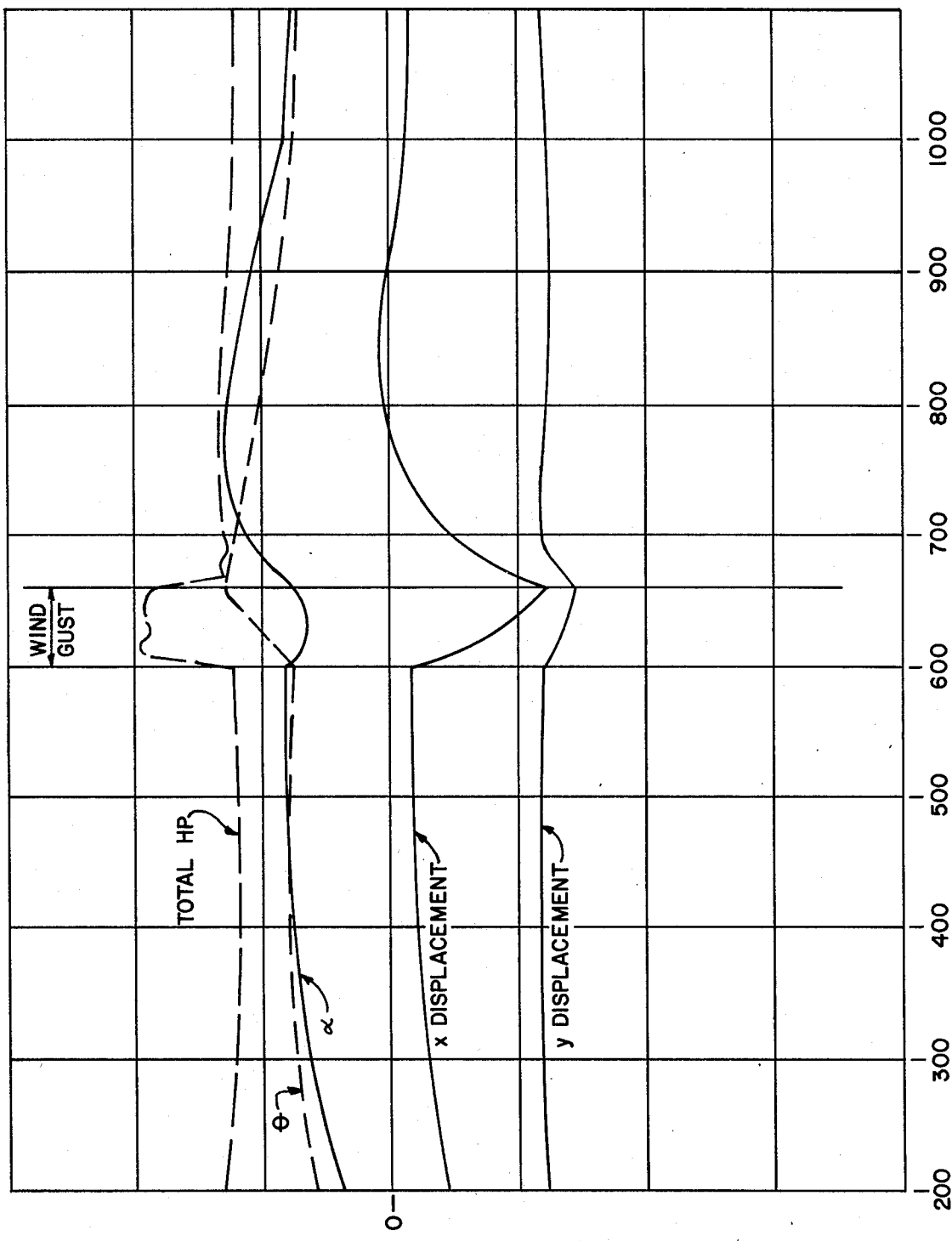
FIG.—9

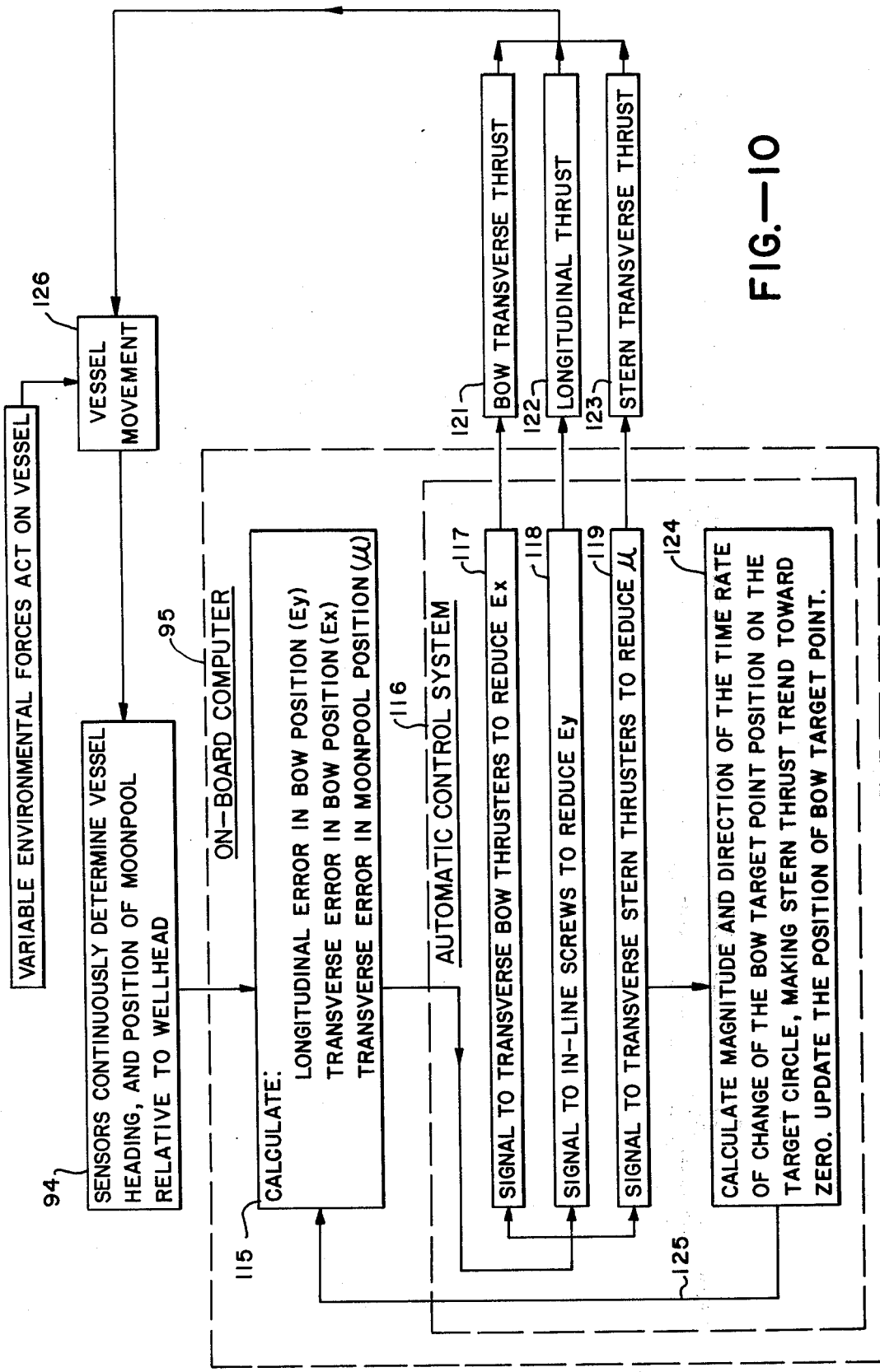
FIG.—10

SEMI-SUBMERSIBLE, DIRECTIONALLY CONTROLLED DRILLING UNIT

BACKGROUND OF THE INVENTION

This invention relates in general to floating vessels that require a stable platform for working above a reference location in a body of water, and in particular the invention relates to vessels such as deep-sea drilling units which are adapted for station keeping above a reference location such as a wellhead on the ocean floor.

Various designs have been developed for ocean going, station keeping vessels in operations such as offshore oil and gas exploration and drilling. Among these designs is the conventional offshore drilling platform which is supported on legs imbedded in the sea bed. However, drilling platforms of this nature are restricted to relatively shallow depths such that their use is infeasible for water depths greater than about 300 feet. For greater depths a number of different designs have been developed in which a floating ship or surface vessel is sailed to the underwater drilling location and is maintained above the desired site while the drilling operation progresses. Drilling ships with conventional hull designs have been used for this purpose by controlling their propulsion units to continually maintain position over the wellhead against environmental forces such as wind, current and wave action. However, ships of this nature are roll sensitive so that they must maintain a heading into the direction of the waves. In most cases such a heading is not favorable to minimize the effects of wind and current, so that additional power must be expended to counter these latter forces while maintaining the drilling position. Semi-submersible drilling units have also been provided which incorporate a drilling platform supported above the water surface by columns mounted on one or more submerged hulls. In such a design the columns are of relatively small cross sectional area so that they are somewhat "invisible" to wave action, with the result that the vessel can maintain a heading which is optimum for current and/or wind conditions without regard to wave direction. Semi-submersible vessels of this nature, however, have been held in station keeping position by mooring lines anchored to the sea bed. Existing semi-submersible vessels of this type have no provision for continuously seeking an optimum heading as environmental forces change.

OBJECTS AND SUMMARY OF THE INVENTION

It is a general object of the invention to provide a new and improved floating vessel and method of operation which is adapted for station keeping with respect to a reference in a body of water.

It is another object of the invention to provide a vessel of the type described which incorporates a lower submerged hull supporting an upper hull above the surface of the water. The configuration of the vessel provides a stable working platform which can be oriented in a heading which is optimum for changing environmental forces such as wind, current and wave action.

Another object is to provide a semi-submersible vessel and method of operation by which the streamlined upper and lower hulls, and streamlined stabilizing columns, are maintained over the reference while continually seeking an optimum heading which minimizes the effects of environmental forces so that the power requirements and fuel consumption are reduced for station keeping.

Another object is to provide a semi-submersible vessel and method of operation which achieves continuous directional control for maintaining an optimum heading by calculating a desired bow target point on a virtual target circle concentric with a reference, and then modulating transverse thrust and in-line propulsion forces for maintaining the bow of the vessel on the target point while a center portion of the vessel is over the reference.

Another object is to provide a deep sea drilling unit and method of operation in which a drilling platform is supported above the surface of the water by a submerged hull which can assume a heading that is independent of wave direction. A control system modulates in-line and bow and stern thrust forces to maintain the unit in register with the wellhead while continually seeking a heading which is optimum for minimizing the effects of environmental forces.

The foregoing and additional objects and features of the invention are provided by a floating vessel which includes a streamlined lower submerged hull from which fore and aft stabilizing columns and a truss system extend upwardly for supporting a streamlined upper hull or drilling platform above the water's surface. Outboard vertical stabilizer columns are mounted on opposite sides of the unit for roll stability. The lower hull is formed with a center opening or moonpool through which a drill stem projects from the drilling platform to a wellhead on the sea floor. Reversible transverse thrusters are mounted in the bow and stern of the lower hull, and in-line propulsion screws are mounted in the stern for generating reversible longitudinal thrust. The control system includes means for sensing changes in heading and transverse and longitudinal position of the unit with respect to the reference. In steady state environmental conditions the bow of the unit is positioned over a bow target point on a virtual target circle concentric with the reference and with the moonpool in register with the reference so that an optimum heading is maintained at which station keeping power requirements are minimized. As changing environmental conditions cause the unit to move from its position, the control system operates the bow and stern thrusters and in-line propulsion screws for reducing the transverse and longitudinal errors in the bow position from the target point and to reduce the transverse error in the moonpool position from the reference. The presence of a stern thrust indicates that the heading is not optimum so that the control system calculates the magnitude and direction of the time rate of change of the bow target point position on the target circle so that the stern thrust trends toward zero. The position of the bow target point is fed back into the program so that the control system is operated to bring the unit's bow into register with the new target point.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a perspective view of a semi-submersible drilling unit incorporating the invention;

FIG. 2 is a side elevational view of the drilling unit of FIG. 1;

FIG. 3 is a top plan view of the drilling unit of FIG. 1;

FIG. 4 is an end elevation view of the drilling unit of FIG. 1;

FIG. 5 is an axial section view taken along the line 5—5 of FIG. 2;

FIG. 6 is a schematic force diagram illustrating the method of the invention;

FIG. 7 is a schematic force diagram similar to FIG. 6;

FIG. 8 is a schematic force diagram similar to FIG. 6;

FIG. 9 is a graph illustrating the method of operation of the invention; and

FIG. 10 is a flow chart illustrating the method of operation of the invention.

DESCRIPTION OF THE PREFERRED EMBODIMENTS

In the drawings FIG. 1 illustrates generally at 12 a semi-submersible floating vessel constructed in accordance with the invention. The vessel 12 is shown as specially adapted as a deep sea drilling unit for station keeping on the ocean surface over a drilling site. While the invention will be described in relation to a deep sea drilling operation, it will become apparent that the apparatus and method of operation can be adapted to many other marine operations where stability is required and where the work being performed is not dependent upon the heading of the vessel. Examples of other applications of the invention would be as a floating platform for deep sea mining, as a stationary weather station or missile platform, or even as a stable floating platform which may be required to follow a course across the surface of a body of water.

Drilling unit 12 includes a bouyant lower hull 13 which is submerged to a pre-determined depth below the water surface. An upper hull 14 is supported above the water's surface by means of fore and aft stabilizer columns 16, 17 and a system of trusses 18, 19 which are mounted on the lower hull. The fore and aft stabilizer columns include bouyant compartments and provide pitch stability from wave action. The upper hull and columns are formed with streamlined elongate configurations which present minimum frontal areas to the environmental forces longitudinally of the unit.

A pair of vertically extending outboard stabilizer columns 21, 22 are mounted on opposite sides of the unit by means of a system of trusses 23, 24. The outboard stabilizer columns include bouyant chambers 26, 27 and provide righting moments for achieving roll stability. The diameters of the trusses which extend between the two hulls and which support the outboard columns are relatively small so that they are relatively "invisible" to wave action, that is the effect of change in bouyancy on the trusses due to wave action is small in comparison to the size of the lower hull. Pontoons 28 and 29 are mounted at the lower end of each outboard stability column. Each pontoon is streamlined in the longitudinal direction to enhance stability and motion during transit of the drilling unit to and from a drilling site.

Lower hull 13 is streamlined longitudinally of the unit so that it may be oriented with a heading having a reduced frontal area to wave and current and thereby minimize the drag forces which these environmental actions create. The lower hull is transversely enlarged amidship to accommodate a central, vertically extending opening or moonpool 31 through which a drill stem 32 extends from the upper hull down to a wellhead, not shown, on the sea floor.

Propulsion means is provided for generating transverse thrust forces at the bow and stern of the lower hull, and for generating longitudinal thrust forces on the lower hull. The propulsion means includes one or more, preferably three, bow tunnel thrusters 33, 34 and 35 mounted in the bow of the lower hull, and one or more, preferably two, stern tunnel thrusters 36 and 37 mounted in the stern of this hull. The tunnel thrusters are similar in construction and operation. Bow thruster 33 is typical and, as shown in FIG. 5, comprises a motor 38 driving a controllable pitch propeller 39 mounted within a cylindrical tunnel 40 which projects transversely through the opposite sides of the hull. Preferably the motors driving the propellers are constant speed electrical motors each rated at 1500 horsepower, although the power size rating of the motors, as well as the number of thrusters required, would depend upon design factors such as the overall size and weight of the drilling unit. The longitudinal thrust force is provided by a pair of in-line controllable pitch screws 42, 43 which are mounted on propeller shafts 44, 45 which extend rearwardly from the stern of the lower hull. The screws are driven by motors 47, 48, which preferably comprises constant speed electrical motors each rated at ten thousand horsepower. The bow and stern thrusters and in-line screws are operated under influence of the control system in a manner to be described for controlling the vessel's position.

The interior of lower hull 13 is divided by bulkheads into a series of compartments. Compartments on opposite sides of the interior form water ballast tanks 49, 50. Pump rooms 52, 53 containing pumping equipment are provided in each end of the lower hull, and the pump rooms are accessible by means of an elevator or ladder from the upper hull through the fore and aft stabilizer columns 16, 17, with a passage 54 interconnecting the aft column with the aft pump room. Suitable self-priming centrifugal pumps are provided in each pump room to bring ballast water into or discharge from the ballast tanks as required for changing the vessel's draft or trim. For example, the tanks would be deballasted to bring the vessel to a minimum draft floating condition for high speed transit, or for a decreased draft for riding out severe storms. For a drilling operation the tanks are ballasted to increase the draft for increased motion stability, while at the same time providing sufficient freeboard under the upper hull for the maximum anticipated wave height. Other compartments in the lower hull include fuel oil tanks 56, 57 and drill water tanks 58, 59 on opposite lateral sides of the moonpool, and fuel oil tanks 61, 62 on opposite longitudinal sides of the moonpool.

The outboard stability columns are divided by bulkheads into a number of compartments as illustrated in FIG. 4. The lower compartments 63, 64 of each column forms a ballast tank into which water is injected and removed by means of ballast pumps 66, 67 contained in upper chambers 26, 27. In the upper chamber of outboard column 21 a bulk storage tank 68 is provided for containing cement, and a similar bulk storage tank 69 is provided in chamber 27 of the opposite outboard column for containing drilling mud.

Upper hull 14 is formed with a main deck 71, a mid deck 72, a weather deck 73 and a drill floor 74 which is mounted above the weather deck by an open ended enclosure 76. A derrick 77 is mounted above drill floor 74 and is centered over an opening or well which extends completely through the upper hull in register with moonpool 31. A number of wells are formed in the upper hull for storage purposes, including a pair of riser pipe storage wells 78 on opposite sides of enclosure 76, a casing storage well 79 and a drill pipe storage well 80. A pair of cranes 82, 83 are mounted on pedestals on port and starboard sides of the weather deck for handling the drilling pipe and casing. A tool house 84 is provided at the stern end of the weather deck, and a heliport 86 is provided at the bow end for accommodating a service helicopter 87. The main and mid decks of the upper hull are divided by bulkheads into a number of compartments including quarters for the crew at the bow end and rooms for storage, prime movers and electrical equipment and the like are provided at the stern end. Compartments are also provided in the upper hull for surge tanks and pumping equipment for cement, and for storage and pumping equipment for mud which is to be used in the drilling operation.

The control system for operating the thrusters and propulsion screws includes an on-board digital computer of suitable design programmed in a manner to process input information of the vessel's heading and position with respect to a reference such as the wellhead on the sea floor. The output from the computer is in the form of control signals which modulate the pitch of the bow and stern thruster propellers and in-line screws. An example of a computer which can be employed would be an IBM System 370, although other similar computers could also be employed. The techniques for programming the computer to process the information are conventional and need not be described in detail.

Input information into the computer is generated responsive to vessel movement due to the effect of environmental forces such as wind, current and wave action. Sensing means is provided to continuously monitor the vessel heading and surge and sway motion of the moonpool relative to the wellhead whereby the control system can maintain the vessel in station keeping register while drilling progresses so as not to damage the drill string which extends to the wellhead. Preferably the sensing means comprises an on-board control circuit which includes a plurality of hydrophones 88, 89, 90 mounted below the lower hull for receiving sonar signals 92 generated by a suitable transponder located adjacent the wellhead. The signals received by the hydrophones are analyzed by conventional methods of triangulation to sense the yaw, surge and sway components of vessel motion. These motion components are sampled over a relatively long time period so that insignificant motions such as those due to individual wave action are not introduced into the system. While a sonar position sensing system is illustrated as preferred, the invention also comtemplates that other sensing methods could be used such as sensing the orientation of a taut wire stretched between the vessel and wellhead, for example.

As shown in the chart of FIG. 10 vessel heading and the position of the moonpool relative to the wellhead are sensed at step 94 and the information is fed into computer 95. As shown in the schematic diagrams of FIGS. 6–8 the computer analyzes the input information in relation to a mathematically established desired bow target point 97 which lies on a virtual target circle 98 concentric with the reference, in this case the wellhead 99. In the schematic diagrams the vessel is represented at 101 with its moonpool 102 in vertical register with the wellhead. In FIG. 6 the conditions are steady state such that the bow 103 of the vessel is in register with bow target point 97 while the environmental forces acting on the vessel are in equilibrium with the forces of the thrusters and in-line screws. The current, wave and wind forces resolve into the resultant environmental linear force 104 and resultant environmental yaw moment 105, and these forces are balanced by the in-line screw force $T_L$ and the moment of bow thrust $T_B$. At the same time the stern transverse thrust $T_S$ is approximately zero. In this condition the vessel's heading is optimum and the propulsion power requirements and fuel consumption are minimum for maintaining station keeping under the given environmental forces. This can be achieved because the streamlined upper and lower hulls and stabilizer columns are free to move to the optimum heading for minimizing the effect of environmental forces.

As illustrated in FIGS. 6–8 the vessel can be considered a weather vane with its pivot point at the vessel's bow such that the vessel is pivoted about that point to assume an optimum heading as the environmental forces act upon it. The in-line screws and bow thrusters operate to keep the bow on that pivot point, i.e., on the bow target point. At an optimum heading as in FIG. 6 the environmental forces can be thought of as acting to swing the vessel about the bow target point to an equilibrium position at which the moonpool is in vertical register with the wellhead. Under steady state environmental conditions in this equilibrium position a stern transverse thrust is not needed to maintain registry of the moonpool with the wellhead.

When the environmental forces change, such as where the wind and/or wave magnitude may change or direction shift, the resultant of the environmental forces will change, as for example to produce the new resultant environmental linear force 110 and resultant environmental yaw moment 111, as shown in FIG. 7. The changed environmental forces disrupt the equilibrium from the existing in-line screw force $T_L$ and bow thrust $T_B$ so that the vessel begins to move with both rotation and translation. Thus, as illustrated in FIG. 8 (with the amount of displacement exaggerated for purposes of explanation) the bow and moonpool of the vessel are displaced from the respective bow target point 97 and wellhead 99. In this figure the fixed or global coordinate system is established along the axes Y-X. Where the vessel's instantaneous heading of longitudinal axis 112 is at an angle $\alpha$ from the Y axis, then the local coordinate system for the vessel is established by the computer along the axes y-x with the ordinate y at the angle $\alpha$ from the ordinate Y of the fixed coordinates. The old bow target point 97 is at an angle $\theta$ from the ordinate Y.

Vessel position information which is fed into the computer is processed at step 115 of the flow chart for calculating, with respect to the local coordinate system, the longitudinal error $E_y$ of the bow position with respect to target point 97, the transverse error $E_x$ of the bow position with respect to the target point and the transverse error $\mu$ of the moonpool with respect to reference wellhead 99. This error information is then fed into automatic control system 116 and converted into thruster and screw control signals for returning the vessel to its bow target point and wellhead position. Thus, at step 117 a signal is generated which will operate the transverse bow thrusters in a manner to reduce $E_x$. At step 118 a signal is generated which will operate the in-line screws in a manner to reduce $E_y$. And at step 119 a signal is generated which will operate the transverse stern thrusters in a manner to reduce $\mu$. The signal from step 117 is employed at step 121 to vary the pitch of the bow thruster propellers to modify the magnitude and direction of the bow thrust. The signal from step 118 is employed at step 122 to vary the pitch of the in-line screws to modify the magnitude and direction of the longitudinal thrust. And the signal from step 119 is employed at step 123 to vary the pitch of the stern thrusters to modify the magnitude and directions of the stern transverse thrust. The signals at steps 117–119 are calculated so that the magnitude of the forces are functions of the magnitude of the respective errors $E_x$, $E_y$ and $\mu$ and their rates of change. In one specific embodiment of the invention, the computer is programmed so that these functions are direct proportion functions. The combination of the modified thrust forces act to move the vessel back to its original orientation at step 126.

The existence of a non-zero value of the stern transverse thrust 123 indicates that the vessel is not at an optimum heading for the changed environmental conditions so that a new bow point must be established at which the heading is optimum. The control system measures the magnitude of the power of the stern thrusters to provide an input for use in step 124 to calculate the magnitude and direction of the time rate of change of the bow target point position on the target circle. The magnitude of the time rate of change of the bow target point is made directly proportional to the power producing the stern thrust, while the target point is changed in a direction on the target circle which makes the stern thrust value trend toward zero. The change in the position of the bow target point is fed back at 125 into step 115 to iteratively repeat the above-described steps. That is, the longitudinal and transverse errors in the bow and moonpool positions are again calculated on the basis on the updated bow target point position. The new error calculations are again fed into automatic control system 116 for generating new signals to operate the bow and stern thrusters and in-line screws. These steps are repeated until the value of the stern thrust reaches zero, at which condition a new optimum heading is achieved with the moonpool again in register with the wellhead and with the environmental forces in equilibrium with the in-line and bow thrust forces.

SUMMARY OF OPERATION OF THE INVENTION

In operation, it will be assumed that the vessel 12 is to be used for deep sea drilling in the ocean over a wellhead location which is provided with a sonar transponder. The vessel is initially deballasted to shallow draft condition for transit to the drilling site. The in-line screws and transverse thrusters are employed for propelling the vessel in transit. At the drilling site the vessel is ballasted to a deep draft condition and the automatic control system is activated. Vessel position information received by the hydrophones 88–90 through sonar signals 92 from the wellhead is input into the computer as real time data.

The chart of FIG. 9 illustrates a specific example of the method of operation of the invention for demonstrating the effect of a short wind gust on vessel 12 which is being controlled at an optimum heading over the wellhead, and for demonstrating the effect of the response of the control system in bringing the vessel back to an optimum heading. The chart plots time in seconds along the abscissa, starting at 200 seconds following the initial application of the environment to the vessel with the control system in operation. The total horsepower of the bow and stern thrusters and in-line screws is plotted on the top line. The desired vessel heading $\theta$ as calculated by the control system and the actual vessel heading $\alpha$ are plotted, as are the $x$ and $y$ displacements of the moonpool from the wellhead with reference to the local coordinate system. It will be seen that at the steady state condition in the 400 to 600 second time span the moonpool $x$ and $y$ displacements are small but not zero. As required, the computer program may be modified to force these displacements to zero. At 600 seconds the environment changes and a sudden wind gust of one minute duration is imposed on the vessel. The vessel responds and moves out of equilibrium as shown by the sharp deflection of the $x$ and $y$ displacement curves, and by the deflection of the $\alpha$ heading curve.

Vessel displacement is detected by the hydrophones, and data on the changed vessel position is input into the computer which calculates the transverse and longitudinal errors $E_x$, $E_y$ of the bow position with respect to the bow target point, and of the transverse error $\mu$ in the moonpool position, as illustrated in FIG. 8. The error information is input into automatic control system 116 which generates signals at 117–119 for operating the bow and stern thrusters and in-line screws to modify the bow and stern transverse forces $T_B$, $T_S$ and longitudinal force $T_L$ for reducing the position errors. The resultant of the forces $T_B$ and $T_L$ moves the vessel's bow back toward bow target point 97. The stern transverse force $T_S$ acts as a moment about the bow to pivot the vessel in a direction to bring the moonpool back into register with wellhead 99. The presence of stern thrust $T_S$ indicates that the heading is not optimum for minimizing power consumption, and the greater the value of $T_S$ then the further the vessel is from the optimum heading. The computer senses the stern thrust and responds to change the position of bow target point 97 on the target circle so that the vessel will seek a new optimum heading. The direction of change of the target point on the target circle is calculated so that the stern thrust trends toward zero. Thus, for the example of FIG. 8 where $T_S$ is to port for reducing $\mu$, the bow target point would be moved in a counter-clockwise direction around target circle 98. The magnitude of the time rate of change of the target point is proportional to the average of the stern thrust power. The changed position of the bow target point is updated and fed back into the program with the foregoing steps iteratively repeated until the optimum heading is achieved and the system returns to steady state conditions, as shown at the 1000 second location on the graph of FIG. 9.

While the foregoing embodiments are at present considered to be preferred it is understood that numerous variations and modifications may be made therein by those skilled in the art. For example, various different hull configurations could be employed which would satisfy the directional control requirements of the invention. Thus, while a single submersed hull is illustrated, twin submersed hulls could be provided with the drill string suspended from the upper hull between the twin hulls. Also, while the method has been described as calculating the position errors using a Cartesian coordinate system, the calculations could be made using a polar coordinate system. It is intended to cover in the appended claims all such variations and modifications as fall within the true spirit and scope of the invention.

We claim:

1. A method for operating a floating vessel having propulsion means, the vessel being adapted to be semi-submersed in a body of water for maintaining the vessel in register with a given reference which is external to the vessel, including iteratively performing the steps of sensing the actual position of the vessel with respect to said reference, calculating a desired position of the vessel which is optimum for minimizing the power expended by the propulsion means in opposing the environmental forces acting on the vessel, said last step including calculating a target position of one end of the vessel at which registry of said one end results in the environmental forces coacting in equilibrium with the forces from the propulsion means to maintain the vessel at the desired position with a portion of the vessel in substantial register with the reference, sensing an error between the actual and desired positions, and operating the propulsion means responsive to the error to move the vessel to said desired position by moving said one end of the vessel into register with said target position.

2. A method as in claim 1 in which the step of sensing an error includes sensing the displacement of the actual position of said one end with respect to the target position, and operating the propulsion means to move said one end in a direction toward said target position to reduce said error.

3. A method as in claim 2 which includes the steps of calculating a transverse error in the displacement of said portion of the vessel with respect to the reference, and operating the propulsion means to pivot the vessel about said one end in a direction to reduce said transverse error.

4. A method as in claim 3 which includes the step of calculating a changed target position at a location at which registry of said one end results in diminution in operation of said propulsion means for said pivoting of the vessel to reduce said transverse error.

5. A method for maintaining a semi-submersible vessel at an optimum heading on the surface of a body of water with respect to a given reference, including the steps of positioning one end of the vessel at a pivot point with respect to a desired target point which lies on a radius from the reference whereby environmental forces such as wind, current and wave action tend to pivot the vessel about said one end to an equilibrium position with a portion of the vessel at a predetermined location with respect to the reference, measuring the transverse displacement of the vessel from the reference, applying a force moment to the vessel about said one end in a direction to reduce said displacement, calculating a new desired target point when said displacement effects application of said moment, said new target point being calculated so that positioning of said one end at the new target point results in a decrease in said displacement and moment, moving said one end toward said new target point, and reiterating the above steps so that the vessel is caused to substantially assume said optimum heading.

6. A method as in claim 5 in which said one end of the vessel is positioned on the target point by imparting a longitudinal thrust force extending along the vessel and a first transverse thrust force at said one end whereby the resultant of said thrust forces counteracts in a steady state condition the resultant of the environmental forces which act on the vessel.

7. A method as in claim 6 in which said force moment is imparted to the vessel by imparting a second transverse thrust force to the other end of the vessel.

8. A method as in claim 7 which includes the steps of measuring the displacement of said one end from the target point, varying the longitudinal thrust force and first transverse thrust force to reduce said displacement of said one end, measuring the transverse displacement of a mid-portion of the vessel from the reference, and said force moment is imparted to the vessel in a direction to move said mid-portion into vertical register with said reference.

9. A method for controlling the position of a semi-submersible unit on the surface of a body of water with respect to a given reference, the unit having a lower submersible hull supporting an upper hull above the surface, including reiteratively performing the steps of calculating a desired target point located on a virtual target circle concentric with the reference, sensing the longitudinal and transverse displacements of one end of the unit from the target point, sensing the transverse displacement of a mid-portion of the unit from the reference, imparting a longitudinal thrust force to the unit for reducing said longitudinal displacement, imparting a transverse thrust to said one end to reduce the transverse displacement, imparting a transverse thrust to the other end of the unit to reduce the transverse displacement of the mid-portion of the unit, and calculating a change position of the target point on the target circle whereby registry of said one end thereon will result in a diminution of said transverse displacement and of said transverse thrust.

10. A method as in claim 9 in which the thrust forces which are imparted to said one end of the unit are proportional to the respective longitudinal and transverse displacements and their time rate of change of said one end.

11. A method as in claim 9 in which the transverse thrust force imparted to the other end of the unit is proportional to the transverse displacement and its time rate of change of said mid-portion from the reference, and the magnitude of the time rate of change of the target point on the target circle is proportional to the magnitude of the transverse displacement resulting in the transverse thrust imparted at the other end of the unit.

12. A method for operating a semi-submersible drilling unit on the surface of a body of water with respect to a wellhead location, the unit including a lower submersible hull with a streamlined configuration and having an upper hull supported above the surface on the lower hull, the upper hull having a drilling rig located at a mid-portion thereof, the lower hull being provided with an in-line propulsion means for producing a longitudinal thrust and bow and stern thrust means for producing respective bow and stern transverse thrust forces, including the steps of calculating a desired bow target point which lies on a virtual target circle concentric with the wellhead, measuring the longitudinal error $E_y$ in the position of the bow from the target point, measuring the transverse error $E_x$ in the position of the bow from the target point, measuring the transverse error $\mu$ in the position of the mid-portion from vertical registry with the wellhead, operating the bow thrust means to produce a transverse thrust in a direction to reduce $E_x$, operating the in-line propulsion means to produce a longitudinal thrust in a direction to reduce $E_y$, operating the stern thrust means to produce a transverse thrust in a direction to reduce $\mu$, calculating a new position of the bow target point on the target circle which will result in the stern thrust trending toward zero, and reiterating the foregoing steps so that said unit substantially assumes an optimum heading at which the thrust means and propulsion means are operated at minimum power for a given combination of environmental forces which act on the unit.

13. In a semi-submersible vessel having propulsion means for moving the vessel in a body of water, the combination of means for sensing the actual position of the vessel with respect to a given reference which is external to the vessel, means for calculating a desired position of the vessel which is optimum for minimizing the power expended by the propulsion means in opposing the environmental forces acting on the vessel, said last-mentioned means including means for calculating a target position of one end of the vessel at which registry of said one end on the target position results in the environmental forces coacting in equilibrium with the forces from the propulsion means to maintain the vessel at the desired position with a portion of the vessel in substantial register with the reference, and means for operating the propulsion means to urge the vessel to said desired position responsive to said first mentioned means sensing a displacement of said actual position from the desired position, in which said operating means operates the propulsion means to maintain said one end of the vessel in substantial register with said target position.

14. A vessel as in claim 13 in which said calculating means includes means operating responsive to said sensing means for calculating an error in the displacement of the actual position of said one end of the vessel with respect to said target position, and said operating means operates the propulsion means to move said one end of the vessel in a direction toward said target position to reduce said error.

15. A vessel as in claim 14 in which said calculating means includes means operating responsive to said sensing means for calculating a transverse error in the actual position of said portion of the vessel with respect to said reference, and said operating means operates the propulsion means to produce a force moment responsive to said transverse error for pivoting the vessel about said one end in a direction to reduce said transverse error.

16. A vessel as in claim 15 in which said calculating means calculates a changed target position of said one end responsive to said transverse error causing operation of the propulsion means, said changed target position being established at a location at which registry of said one end results in a diminution of said force moment.

17. A vessel adapted for operation on the surface of a body of water in station-keeping position over a given reference location, including the combination of a submersible lower hull, bow and stern thruster means in the lower hull for producing respective bow and stern transverse thrust forces, in-line propulsion means in the lower hull for producing longitudinal thrust forces, an upper hull mounted on the lower hull above the surface of the water, and control means for establishing the vessel over the reference at an optimum heading which minimizes the effects of environmental forces such as wind, current and wave action, the control means including means for calculating a desired bow target point on a target circle which is concentric with the reference, means for measuring the displacement of the position of the bow from the bow target point, error means for measuring the transverse displacement of the vessel from the reference, means for operating the bow thruster means and in-line propulsion means for generating respective transverse and longitudinal thrust forces in directions which will reduce said displacement of the bow position, means for operating the stern thruster means for generating a transverse stern thrust force in a direction to reduce said transverse displacement, and means to calculate a new position of the bow target point on the target circle when the transverse stern thrusters are operated due to said transverse displacement, said new bow target point being calculated at a position whereby the magnitude of the stern transverse thrust tends toward zero as the bow is caused to move toward the new bow target point.

18. A vessel as in claim 17 in which the error means measures longitudinal and transverse displacement of said bow position from the bow target point, and the control means operates the transverse bow thruster means and in-line propulsion means to produce respective bow transverse thrust forces and longitudinal thrust forces which are proportional to the magnitude of the respective longitudinal and transverse displacements of the bow position.

19. A semi-submersible drilling unit for operation on the surface of a body of water over a wellhead location, including the combination of an elongate lower submersible hull having bow and stern ends with a vertically extending moonpool at a mid-portion thereof, support means mounted on the lower hull and extending upwardly above the surface of the water, an upper hull mounted on the support means above the surface, a pair of vertically elongate stabilizer columns mounted outboard of and on opposite lateral sides of the unit, drilling means on the upper hull for supporting and controlling a drill stem extending downwardly through the moonpool, bow thruster means at the bow of the lower hull for generating a transversely directed, reversible thrust force, in-line propulsion means at the stern of the lower hull for generating a longitudinally directed and reversible thrust force, stern thruster means at the stern of the lower hull for generating a transversely directed, reversible thrust force, and control means for operating the bow and stern thruster means and in-line propulsion means for maintaining said moonpool in substantial vertical register with the wellhead and for establishing a selected heading of the vessel at which substantially minimum power is expended to counteract the environmental forces.

20. A drilling unit as in claim 19 in which the lower hull is streamlined longitudinally thereof to minimize the drag force of current and wave action, and the control system includes means for sensing displacement of the unit from a position over the wellhead due to environmental forces acting thereon, and means to operate said bow and stern thruster means and in-line propulsion means to maintain the unit in register with the wellhead and to control the heading thereof to an optimum direction which minimizes the power required for operating the thruster means and propulsion means for given environmental forces which act on the unit.

21. A drilling unit as in claim 20 in which the upper hull is streamlined to minimize the drag force of wind action when the control system maintains the heading of the unit at said optimum direction.

22. A method for maintaining a semi-submersible vessel at an optimum heading on the surface of a body of water with respect to a given reference, including the steps of holding one end of the vessel in register with a desired target point which lies on a radius from the reference whereby environmental forces such as wind, current and wave action tend to pivot the vessel about said one end to an equilibrium position, measuring the transverse displacement of the vessel from the reference, applying a force moment to the vessel about said one end in a direction to reduce said displacement, calculating a new desired target point when said displacement effects application of said moment by calculating the time rate of change of the new target point with a magnitude proportional to the magnitude of said force moment which is applied to the vessel, said new target point being calculated so that registry of said one end thereon results in a decrease in said displacement and moment, moving said one end toward said new target point, and reiterating the above steps so that said vessel is caused to substantially assume said optimum heading.

23. A vessel adapted for operation on the surface of a body of water in station-keeping position over a given reference location, including the combination of a submersible lower hull, bow and stern thruster means in the lower hull for producing respective bow and stern transverse thrust forces, in-line propulsion means in the lower hull for producing longitudinal thrust forces, an upper hull mounted on the lower hull above the surface of the water, and control means for establishing the vessel over the reference at an optimum heading which minimizes the effects of environmental forces such as wind, current and wave action, the control means including means for calculating a desired bow target point on a target circle which is concentric with the reference, means for measuring the displacement of the position of the bow from the bow target point, error means for measuring the transverse displacement of the vessel from the reference, means for operating the bow thruster means and in-line propulsion means for generating respective transverse and longitudinal thrust forces in directions which will reduce said displacement of the bow position, means for operating the stern thruster means for generating transverse stern thrust force in a direction to reduce said transverse displacement, said control means operating the transverse sten thruster to produce the stern thrust with a magnitude proportional to said transverse displacement of the vessel and its time rate of change, means to calculate a new position of the bow target point on the target circle when the transverse thrusters are operated due to said transverse displacement, said new bow target point being calculated at a position whereby the magnitude of the stern transverse thrust trends toward zero as the bow is caused to move toward the new target point, together with means for calculating the change of the bow target point on the target circle at a time rate of change which is proportional to the magnitude of the stern transverse thrust.

* * * * *